US012057260B2

(12) United States Patent
Kodama et al.

(10) Patent No.: US 12,057,260 B2

(45) Date of Patent: Aug. 6, 2024

(54) SILICON OXIDE-COATED IRON POWDER, METHOD FOR PRODUCING THE SAME, MOLDED BODY FOR INDUCTOR USING THE SAME, AND INDUCTOR

(71) Applicant: DOWA ELECTRONICS MATERIALS CO., LTD., Tokyo (JP)

(72) Inventors: Daisuke Kodama, Tokyo (JP); Masahiro Gotoh, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 409 days.

(21) Appl. No.: 16/957,397

(22) PCT Filed: Jan. 11, 2019

(86) PCT No.: PCT/JP2019/000616

§ 371 (c)(1),
(2) Date: Jun. 24, 2020

(87) PCT Pub. No.: WO2019/142727

PCT Pub. Date: Jul. 25, 2019

(65) Prior Publication Data

US 2021/0050132 A1 Feb. 18, 2021

(30) Foreign Application Priority Data

Jan. 17, 2018 (JP) ................................ 2018-005405
Dec. 10, 2018 (JP) ................................ 2018-230914

(51) Int. Cl.
*H01F 3/08* (2006.01)
*B22F 1/05* (2022.01)
(Continued)

(52) U.S. Cl.
CPC .................. *H01F 3/08* (2013.01); *B22F 1/05* (2022.01); *B22F 1/102* (2022.01); *B22F 1/16* (2022.01);
(Continued)

(58) Field of Classification Search
CPC ............. H01F 1/14766; H01F 1/14783; H01F 1/12–38; B22F 2304/056; B22F 2304/058
See application file for complete search history.

(56) References Cited

U.S. PATENT DOCUMENTS 5,993,569 A * 11/1999 Simon ....................... H01F 1/20
148/306
6,863,979 B2 * 3/2005 Atarashi .................. B22F 1/18
428/404
(Continued)

FOREIGN PATENT DOCUMENTS

JP 02-175806 7/1990
JP 03-229806 10/1991
(Continued)

OTHER PUBLICATIONS

Moyer K.; "Magnetic Materials and Properties for Part Applications"; ASM Handbook, vol. 7, "Powder Metal Technologies and Applications"; 1998 (Year: 1998).*

*Primary Examiner* — Alexandra M Moore
*Assistant Examiner* — Austin Pollock
(74) *Attorney, Agent, or Firm* — Clark & Brody LP

(57) ABSTRACT

A silicon oxide-coated iron powder has a small particle diameter, can achieve high in a high frequency band, and has high insulating property. In a method for producing the powder, a silicon alkoxide is added to a slurry containing iron powder having an average particle diameter of 0.25 μm or more and 0.80 μm or less and an average axial ratio of 1.5 or less dispersed in a mixed solvent of water and an organic material containing water in an amount of 1% by mass or
(Continued)

more and 40% by mass or less. Then, a hydrolysis catalyst for the silicon alkoxide is added to perform silicon oxide coating, the method resulting in a silicon oxide-coated iron powder having the high μ' in a high frequency band and the high insulating property.

4 Claims, 1 Drawing Sheet

(51) Int. Cl.

| | |
|---|---|
| ***B22F 1/102*** | (2022.01) |
| ***B22F 1/16*** | (2022.01) |
| ***H01F 1/147*** | (2006.01) |
| ***H01F 27/255*** | (2006.01) |

(52) U.S. Cl.

CPC ....... *H01F 1/14766* (2013.01); *H01F 27/255* (2013.01); *B22F 2301/35* (2013.01); *B22F 2302/256* (2013.01); *B22F 2304/10* (2013.01)

(56) References Cited

U.S. PATENT DOCUMENTS 11,081,266 B2 * 8/2021 Hosono ................... H01F 27/24
2010/0000769 A1 * 1/2010 Ohmi ........................ H01F 1/26 252/62.51 R
2011/0159181 A1 * 6/2011 Kaneko ..................... B22F 1/17 427/214
2013/0181802 A1 * 7/2013 Watanabe ................. B22F 3/16 252/62.51 R
2015/0104664 A1 * 4/2015 Ikari ......................... H01F 1/26 335/297

FOREIGN PATENT DOCUMENTS

| | | | | | |
|---|---|---|---|---|---|
| JP | 2001339916 A | * | 12/2001 | | |
| JP | 2006249528 A | * | 9/2006 | | |
| JP | 2008147404 A | * | 6/2008 | | |
| JP | 2009-231481 | | 10/2009 | | |
| JP | 2010-024478 | | 2/2010 | | |
| JP | 2010103427 A | * | 5/2010 | ............ | B22F 1/0059 |
| JP | 2011246820 A | * | 12/2011 | ............ | B22F 1/0018 |
| JP | 2013149854 A | * | 8/2013 | ............ | B22F 1/0018 |
| JP | 2014-060284 | | 4/2014 | | |
| JP | 2016-014162 | | 1/2016 | | |
| JP | 2016-139788 | | 8/2016 | | |
| WO | WO-2014141318 A1 | * | 9/2014 | ............ | B22F 1/0059 |
| WO | WO-2019069923 A1 | * | 4/2019 | ................ | B22F 1/00 |

* cited by examiner

[Fig.1]
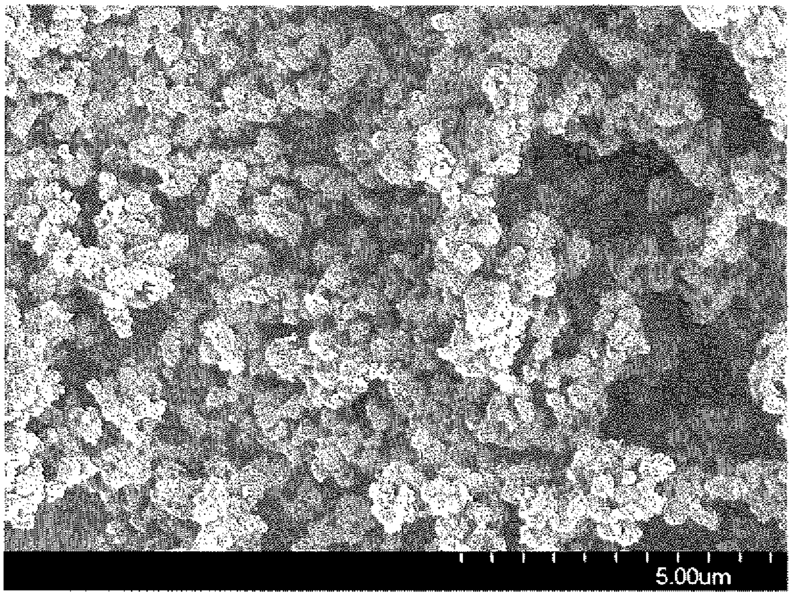
[Fig.2]
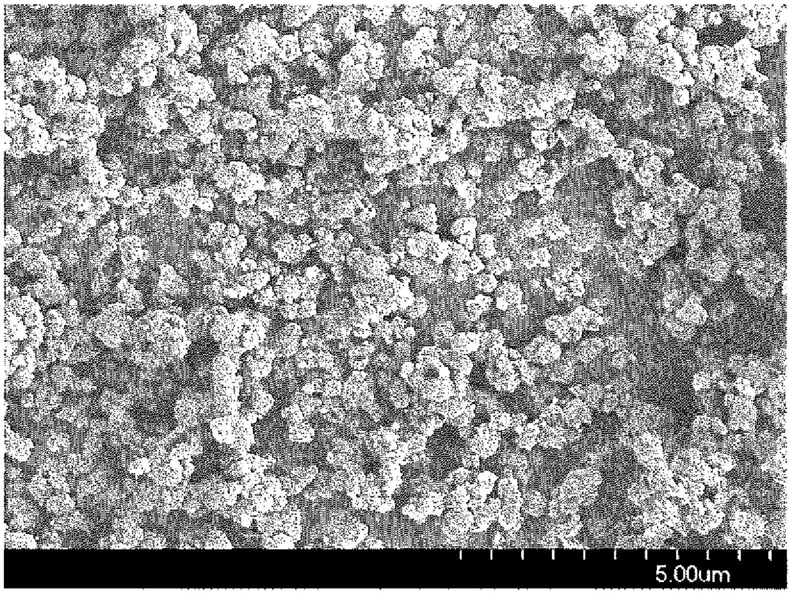

SILICON OXIDE-COATED IRON POWDER, METHOD FOR PRODUCING THE SAME, MOLDED BODY FOR INDUCTOR USING THE SAME, AND INDUCTOR

TECHNICAL FIELD

The present invention relates to silicon oxide-coated iron powder that is suitable for the production of a powder compact magnetic core for an inductor, a method for producing the same, a molded body for an inductor using the same, and an inductor.

BACKGROUND ART

Powder of an iron based metal, which is a magnetic material, molded as a powder compact has been used as a magnetic core of an inductor. Examples of the known iron based metal include powder of an iron based alloy, such as an Fe based amorphous alloy containing large amounts of Si and B (PTL 1), an Fe—Si—Al based Sendust, and a permalloy (PTL 2), and carbonyl iron powder (NPL 1). These kinds of iron based metal powder have been formed into a composite with an organic resin and into a coating material, and applied to the production of a surface mounting coil component (PTL 2).

A power inductor, which is one kind of inductors, is being used in higher frequencies in recent years, and an inductor capable of being used at a high frequency of 100 MHz or more is demanded. As a production method of an inductor for a high frequency band, for example, PTL 3 describes an inductor using a magnetic material composition obtained by mixing nickel based metal powder having a minute particle diameter with iron based metal powder having a large particle diameter and iron based metal powder having an intermediate particle diameter, and a production method therefor. The use of the nickel based metal powder having a minute particle diameter mixed is for the enhancement of the packing density of the magnetic materials by mixing powder having different particle diameters, resulting in the enhancement of the permeability of the inductor. However, according to the technique described in PTL 3, the packing density of the powder compact is increased by mixing the magnetic materials having different particle diameters, but there is a problem that the increase of the permeability of the finally resulting inductor is small.

Soft magnetic powder for an inductor is generally coated with an insulating material. A production method of soft magnetic powder coated with an insulating material is described, for example, in PTL 4, but insulating material-coated soft magnetic powder obtained in PTL 4 has a problem that the large average film thickness of the coating layer decreases the powder compact density of the magnetic powder, which deteriorates the magnetic characteristics.

CITATION LIST

Patent Literatures

PTL 1: JP-A-2016-014162

PTL 2: JP-A-2014-060284

PTL 3: JP-A-2016-139788

PTL 4: JP-A-2009-231481

Non-Patent Literature

NFL 1: Yuichiro Sugawa et al., 12th MMM/INTERMAG CONFERENCE, CONTRIBUTED PAPER, HU-04, final manuscript

SUMMARY OF INVENTION

Technical Problem

The reason why the permeability of the inductor obtained by the technique of PTL 3 is not significantly high is considered to be the permeability of the nickel based metal powder that is lower than that of the iron based metal powder. Accordingly, it is expected that an inductor having a high permeability can be obtained by mixing iron powder having a minute particle diameter and a higher permeability than the nickel based metal. However, iron powder having a minute particle diameter with an average particle diameter of 0.8 μm or less has not been obtained, and there has been a limitation in the enhancement of the permeability of the inductor.

The present applicant has described, in Japanese Patent Application No. 2017-134617, iron powder that has a particle diameter of from 0.25 to 0.80 μm, an axial ratio of 1.5 or less, and a high permeability μ' at 100 MHz, silicon oxide-coated iron powder, and a production method thereof. In the production method described in the application, iron powder is produced by a wet method with a phosphorus-containing ion co-existing, and at this time, iron powder coated with a silicon oxide containing a small amount of phosphorus is obtained. However, the iron powder coated with a silicon oxide containing a small amount of phosphorus has a problem of low insulating property.

In view of the aforementioned problem, an object of the present invention is to provide silicon oxide-coated iron powder that has a small particle diameter, can achieve high μ' in a high frequency band, and has high insulating property, and a method for producing the same.

Solution to Problem

For achieving the object, the present invention provides silicon oxide-coated iron powder containing iron particles having an average particle diameter of 0.25 μm or more and 0.80 μm or less and an average axial ratio of 1.5 or less, having coated on a surface thereof a silicon oxide, having a Si content of 1.0% by mass or more and 10% by mass or less, providing a powder compact obtained through vertical compression molding of the silicon oxide-coated iron powder at 64 MPa that has a volume resistivity of $1.0\times10^5$ Ω·cm or more measured in a state of applying a voltage of 10 V to the powder compact.

The silicon oxide-coated iron powder preferably has a P content of the iron particles of 0.1% by mass or more and 1.0% by mass or less based on the mass of the iron particles, and the powder compact obtained through compression molding of the silicon oxide-coated iron powder at 64 MPa preferably has a powder compact density of 4.0 g/cm$^3$ or less.

The present invention also provides a method for producing silicon oxide-coated iron powder containing iron particles having an average particle diameter of 0.25 μm or more and 0.80 μm or less and an average axial ratio of 1.5 or less, having coated on a surface thereof a silicon oxide, having a Si content of 1.0% by mass or more and 10% by mass or less, the method for producing silicon oxide-coated iron powder, including: an iron powder producing step of preparing iron powder containing iron particles having an average particle diameter of 0.25 μm or more and 0.80 μm or less and an average axial ratio of 1.5 or less; a slurry retaining step of retaining a slurry obtained by dispersing the iron powder obtained in the preceding step in a mixed solvent of water and an organic material containing water in an amount of 1% by mass or more and 40% by mass or less; an alkoxide adding step of adding a silicon alkoxide to the slurry containing the iron powder dispersed and retained in the mixed solvent; a hydrolysis catalyst adding step of adding a hydrolysis catalyst for the silicon alkoxide to the slurry having the silicon alkoxide added thereto, so as to provide a slurry having dispersed therein iron powder coated with a silicon oxide; and a recovering step of subjecting the slurry containing the iron powder coated with the silicon oxide to solid-liquid separation, so as to provide iron powder coated with a silicon oxide.

Advantageous Effects of Invention

By applying the production method of the present invention, silicon oxide-coated iron powder that has a small particle diameter, can achieve high μ' in a high frequency band, and has high insulating property can be produced.

BRIEF DESCRIPTION OF DRAWINGS

FIG. 1 is an SEM image of the iron powder obtained in Comparative Example 1.

FIG. 2 is an SEM image of the iron powder obtained in Example 1.

DESCRIPTION OF EMBODIMENTS

[Iron Particles]

The iron particles as the core of the silicon oxide-coated iron powder of the present invention are particles of substantially pure iron except for P and other impurities that are unavoidably incorporated due to the production process thereof. The iron particles preferably have an average particle diameter of 0.25 μm or more and 0.80 μm or less and an axial ratio of 1.5 or less. Only in the case where the average particle diameter and the axial ratio are in the ranges, large μ' and small tan δ can be achieved simultaneously. The average particle diameter that is less than 0.25 μm is not preferred since μ' may be small. The average particle diameter that exceeds 0.80 μm is not preferred since tan δ may be increased associated with the increase of the eddy current loss. The average particle diameter is more preferably 0.30 μm or more and 0.80 μm or less, further preferably 0.31 μm or more and 0.80 μm or less, and still further preferably 0.40 μm or more and 0.80 μm or less. The average axial ratio that exceeds 1.5 is not preferred since μ' may be decreased due to the increase of the magnetic anisotropy. The lower limit of the average axial ratio is not particularly determined, and the iron powder having an axial ratio of 1.10 or more may be generally obtained. The coefficient of variation of the axial ratio may be, for example, 0.10 or more and 0.25 or less. In the description herein, the term iron particles may be used in the case where the individual iron particles are targeted, and the iron particles may be expressed as iron powder in the case where the average characteristics of the aggregate of the iron particles are targeted.

[P Content]

The iron particles as the core of the silicon oxide-coated iron powder of the present invention are produced by a wet method in the presence of a phosphorus-containing ion as described later, and therefore substantially contain P. The average P content in the iron powder constituted by the iron particles used in the present invention is preferably 0.1% by mass or more and 1.0% by mass or less based on the mass of the iron powder. The P content that is outside the range is not preferred since it may be difficult to produce the iron particles that have the average particle diameter and the axial ratio described above. The P content is more preferably 0.1% by mass or more and 0.7% by mass or less, and further preferably 0.15% by mass or more and 0.4% by mass or less. The P contained does not contribute to the enhancement of the magnetic characteristics, but may be allowed as far as the content is in the range.

[Silicon Oxide Coating]

In the present invention, the surface of the iron particles is coated with an insulating silicon oxide by the wet coating method using a silicon alkoxide. The coating method using a silicon alkoxide is a method that is generally referred to as a sol-gel method, and is excellent in mass productivity than the dry method.

The hydrolysis of a silicon alkoxide forms a silanol derivative through the substitution of all or a part of the alkoxy groups by hydroxy groups (OH groups). The silanol derivative is an organic silicon compound having a silanol group Si—OH in the molecular structure thereof. In the present invention, in which the surface of the iron powder is coated with the silanol derivative, the silanol derivative thus coated becomes to have a polysiloxane structure through condensation or polymerization under heating, and the polysiloxane structure further becomes silica ($SiO_2$) under heating. In the present invention, all the materials of from the silanol derivative coating having a part of the alkoxy group remaining as an organic substance to the silica coating are generically referred to as a silicon oxide coating.

The content of Si contained in the silicon oxide-coated iron powder is preferably 1.0% by mass or more and 10% by mass or less based on the mass of the silicon oxide-coated iron powder for securing the insulating property and for providing a high permeability μ' in a high frequency region. For the silicon oxide-coated iron powder using the iron particles having an average particle diameter of 0.25 μm or more and 0.80 μm or less and an average axial ratio of 1.5 or less described above as the core, the aforementioned content of Si corresponds to an average film thickness of from 0.5 to 8.0 nm.

In the case where the content of Si contained in the silicon oxide-coated iron powder is less than 1.0% by mass, a large amount of defects may exist in the Si oxide coating layer, and it may be difficult to secure the insulating property. The content of Si that exceeds 10% by mass is not preferred since the powder compact density may be decreased to deteriorate the magnetic characteristics although the insulating property may be enhanced. The Si content can be measured by the dissolution method described later.

[Volume Resistivity]

The silicon oxide-coated iron powder of the present invention preferably provides a powder compact obtained through vertical compression molding thereof at 64 MPa that has a volume resistivity of $1.0\times10^5$ Ω·cm or more measured in a state of applying a voltage of 10 V to the powder compact. The volume resistivity that is less than $1.0\times10^5$ Ω·cm is not preferred since the insulation among the particles may not be sufficient, and the loss due to the influence of the eddy current among the particles may be increased, resulting in the deterioration of the characteristics in fabricating an inductor and the like. In the present invention, the upper limit of the volume resistivity of the powder compact is not particularly determined, and in the case of the content of Si described above, a powder compact having a volume resistivity of approximately from $1.0\times10^5$ to $1.0\times10^9$ Ω·cm may be obtained. The volume resistivity is increased with the increase of the thickness of the silicon oxide coating layer, but the silicon oxide coating is a non-magnetic component and may deteriorate the magnetic characteristics as described above.

[Powder Compact Density]

In the present invention, the powder compact obtained through compression molding of the silicon oxide-coated iron powder at 64 MPa preferably has a powder compact density of 4.0 g/cm$^3$ or less. This is because the inductor can be reduced in weight or length in the case where the high permeability μ' and the high insulating property described above can be obtained in a state with a smaller powder compact density.

[Iron Powder Producing Step]

The iron particles as the core of the silicon oxide-coated iron powder of the present invention can be produced by the production method described in Japanese Patent Application No. 2017-134617 described above. The production method described in the application has the feature that the wet method is performed in the presence of the phosphorus-containing ion, and is roughly classified into three embodiments, and the iron powder constituted by the iron particles having an average particle diameter of 0.25 μm or more and 0.80 μm or less and an average axial ratio of 1.5 or less as the core can be obtained by any of the embodiments.

[Starting Substance]

In the iron powder producing step of the present invention, an acidic aqueous solution containing a trivalent Fe ion (which may be hereinafter referred to as a raw material solution) is used as a starting substance of the silicon oxide-coated iron oxide powder, which is the precursor of the silicon oxide-coated iron powder. In the case where a divalent Fe ion is used as the starting substance instead of a trivalent Fe ion, a mixture containing a hydrated oxide of the divalent iron, magnetite, and the like, in addition to the hydrated oxide of the trivalent iron is formed as a precipitate, which may cause variation in shape of the iron particles finally obtained, failing to provide the iron powder and the silicon oxide-coated iron powder as in the present invention. The term acidic herein means pH of the solution of less than 7. The supply source of the Fe ion is preferably a water soluble inorganic acid salt, such as a nitrate, a sulfate, and a chloride, from the standpoint of the availability and the cost. By dissolving the Fe salt in water, the aqueous solution exhibits acidity through hydrolysis of the Fe ion. By neutralizing the acidic aqueous solution containing the Fe ion by adding an alkali thereto, the precipitate of the hydrated oxide of iron is obtained. The hydrated oxide of iron herein is a substance represented by the general formula $Fe_2O_3 \cdot nH_2O$, and is FeOOH (iron oxyhydroxide) when n=1, or $Fe(OH)_3$ (iron hydroxide) when n=3.

The Fe ion concentration in the raw material solution is not particularly determined in the present invention, and is preferably 0.01 mol/L or more and 1 mol/L or less. The concentration of less than 0.01 mol/L is not economically preferred since the amount of the precipitate obtained through single reaction is small. The Fe ion concentration that exceeds 1 mol/L is not preferred since the reaction solution tends to gel through the rapid formation of a precipitate of the hydrated oxide.

[Phosphorous-Containing Ion]

In the iron powder producing step in the present invention, a phosphorus-containing ion is made to co-exist at the time of the formation of the precipitate of the hydrated oxide of iron, or a phosphorus-containing ion is added during the addition of the silane compound for coating the hydrolyzate. In both cases, the phosphorus-containing ion co-exists in the system in coating the silane compound. The supply source of the phosphorus-containing ion may be phosphoric acid or a soluble phosphate salt ($PO_4^{3-}$), such as ammonium phosphate, Na phosphate, monohydrogen salts thereof, and dihydrogen salts thereof. Phosphoric acid is a tribasic acid dissociating in three stages in an aqueous solution, and may be in the existing forms of a phosphate ion, a phosphate dihydrogen ion, and a phosphate monohydrogen ion in an aqueous solution. The existing form thereof is determined by the pH of the aqueous solution, but not by the kind of the reagent used as the supply source of the phosphate ion, and therefore the aforementioned ions containing a phosphate group are generically referred to as a phosphate ion. As the supply source of the phosphate ion in the present invention, diphosphoric acid (pyrophosphoric acid), which is a condensed phosphoric acid, may also be used. In the present invention, instead of the phosphate ion ($PO_4^{3-}$), a phosphite ion ($PO_3^{3-}$) and a hypophosphite ion ($PO_2^{2-}$) having different oxidation numbers of P may also be used. These oxide ions containing phosphorus (P) are generically referred to as a phosphorus-containing ion.

The amount of the phosphorus-containing ion added to the raw material solution is preferably 0.003 or more and 0.1 or less in terms of the molar ratio with respect to the total moles of Fe contained in the raw material solution (P/Fe ratio). In the case where the P/Fe ratio is less than 0.003, the effect of increasing the average particle diameter of the iron oxide powder contained in the silicon oxide-coated iron oxide powder may be insufficient, and in the case where the P/Fe ratio exceeds 0.1, the effect of increasing the particle diameter may not be obtained while the mechanism thereof is unclear. The P/Fe ratio is more preferably 0.005 or more and 0.05 or less.

Although the mechanism that the iron particles having an average particle diameter of 0.25 μm or more and 0.80 μm or less and an average axial ratio of 1.5 or less are obtained by the co-existence of the phosphorus-containing ion is unclear, the present inventors estimate that the silicon oxide coating layer described later is changed in the property thereof due to the phosphorus-containing ion contained.

As described later, the time of addition of the phosphorus-containing ion to the raw material solution may be any of before the neutralization treatment, after the neutralization treatment and before the coating with the silicon oxide, and during the addition of the silane compound, as described above.

[Neutralization Treatment]

In the first embodiment of the iron powder producing step of the present invention, an alkali is added to the raw material solution containing the phosphorus-containing ion under agitation with a known mechanical means, so as to neutralize the solution to make the pH thereof of 7 or more and 13 or less, thereby forming the precipitate of the hydrated oxide of iron. The examples described later will be explained based mainly on the first embodiment.

The pH after the neutralization that is less than 7 is not preferred since the iron ion is not precipitated in the form of the hydrated oxide of iron. The pH after the neutralization that exceeds 13 is also not preferred since the hydrolysis of the silane compound added in the silicon oxide coating step described later rapidly proceeds, and the coating of the hydrolyzate of the silane compound becomes non-uniform.

In the production method of the present invention, in neutralizing the raw material solution containing the phosphorus-containing ion with an alkali, a method of adding the raw material solution containing the phosphorus-containing ion to an alkali may be employed, in addition to the method of adding an alkali to the raw material solution containing the phosphorus-containing ion.

The value of pH shown in the description herein is measured according to JIS 28802 with a glass electrode. The value is measured with a pH meter having been calibrated with a suitable buffer solution corresponding to the pH range to be measured. The pH shown in the description herein is a value that is obtained by directly reading the measured value shown by the pH meter compensated with a temperature compensated electrode, under the reaction temperature condition.

The alkali used for the neutralization may be any of a hydroxide of an alkali metal or an alkaline earth metal, aqueous ammonia, and an ammonium salt, such as ammonium hydrogen carbonate, and aqueous ammonia or ammonium hydrogen carbonate, which may leave less impurities at the time when the precipitate of the hydrated oxide of iron is finally converted to the iron oxide through the heat treatment, is preferably used. The alkali may be added in the form of solid to the aqueous solution of the starting substance, and is preferably added in the form of an aqueous solution from the standpoint of the securement of the uniformity in reaction.

After completing the neutralization reaction, the slurry containing the precipitate is retained at that pH for 5 minutes to 24 hours under stirring, so as to age the precipitate.

In the production method of the present invention, the reaction temperature in the neutralization treatment is not particularly defined, and is preferably 10° C. or more and 90° C. or less. The reaction temperature that is less than 10° C. or exceeds 90° C. is not preferred in consideration of the energy cost required for controlling the temperature.

In the second embodiment of the production method of the present invention, an alkali is added to the raw material solution under agitation with a known mechanical means to perform neutralization until the pH thereof reaches 7 or more and 13 or less, so as to form the precipitate of the hydrated oxide of iron, and then in the step of aging the precipitate, the phosphorus-containing ion is added to the slurry containing the precipitate. The time of addition of the phosphorus-containing ion may be immediately after the formation of the precipitate or during the aging. The aging time and the reaction temperature of the precipitate in the second embodiment may be the same as those in the first embodiment.

In the third embodiment of the production method of the present invention, an alkali is added to the raw material solution under agitation with a known mechanical means to perform neutralization until the pH thereof reaches 7 or more and 13 or less, so as to form the precipitate of the hydrated oxide of iron, and then the precipitate is aged. In this embodiment, the phosphorus-containing ion is added in coating the silicon oxide.

[Coating with Hydrolyzate of Silane Compound]

In the iron powder producing step of the present invention, the precipitate of the hydrated oxide of iron formed through the preceding steps is coated with the hydrolyzate of the silane compound. The coating method of the hydrolyzate of the silane compound is preferably a so-called sol-gel method.

In the sol-gel method, a silicon compound having a hydrolyzable group, such as tetraethoxysilane (TEOS) and tetramethoxysilane (TMOS), or a silane compound, such as various silane coupling agents, is added to the slurry of the precipitate of the hydrated oxide of iron to perform hydrolysis reaction under agitation, and the surface of the precipitate of the hydrated oxide of iron is coated with the hydrolyzate of the silane compound thus formed. At this time, an acid catalyst or an alkali catalyst may be added, and the catalyst is preferably added in consideration of the treating time. Representative examples of the acid catalyst include hydrochloric acid, and representative examples of the alkali catalyst include ammonia. In the case where an acid catalyst is used, it is necessary that the amount thereof added is limited to such an amount that the precipitate of the hydrated oxide of iron is not dissolved.

The specific method of coating the hydrolyzate of the silane compound may be the same as the sol-gel method in the known process, and the ratio of the total molar number of the trivalent Fe ion charged in the raw material solution and the total molar number of Si contained in the silicon compound dripped to the slurry (Si/Fe ratio) may be 0.05 or more and 0.5 or less. The reaction temperature in the coating with the hydrolyzate of the silane compound by the sol-gel method may be 20° C. or more and 60° C. or less, and the reaction time therefor may be approximately 1 h or more and 20 h or less.

In the third embodiment of the iron powder producing step of the present invention, the phosphorus-containing ion is simultaneously added to the slurry containing the precipitate of the hydrated oxide of iron obtained through the aging after the neutralization, during the period of from the start of addition of the silicon compound having a hydrolyzable group to the completion of the addition thereof. The time of addition of the phosphorus-containing ion may be simultaneous with the start of addition of the silicon oxide having a hydrolyzable group, and may be simultaneous with the completion of addition thereof.

[Recovery of Precipitate]

The precipitate of the hydrated oxide of iron coated with the hydrolyzate of the silane compound is isolated from the slurry obtained through the aforementioned step. The solid-liquid separation means used may be a known solid-liquid separation means, such as filtration, centrifugal separation, and decantation. In the solid-liquid separation, an aggregating agent may be added for performing the solid-liquid separation. It is preferred that subsequently the precipitate of the hydrated oxide of iron coated with the hydrolyzate of the silane compound obtained through the solid-liquid separation is washed, and then solid-liquid separation thereof is performed again. The washing method may be a known washing method, such as repulping washing. The precipitate of the hydrated oxide of iron coated with the hydrolyzate of the silane compound thus obtained finally is subjected to a drying treatment. The drying treatment is performed for removing water attached to the precipitate, and may be performed at a temperature of approximately 110° C., which is higher than the boiling point of water.

[Heating Treatment]

In the iron powder producing step of the present invention, the precipitate of the hydrated oxide of iron coated with the hydrolyzate of the silane compound is subjected to a heat treatment, so as to provide silicon oxide-coated iron oxide powder as a precursor of the silicon oxide-coated iron powder. The atmosphere of the heat treatment is not particularly determined, and may be the air atmosphere. The heating may be performed in a range approximately of 500° C. or more and 1,500° C. or less. The heat treatment temperature that is less than 500° C. is not preferred since the particles may not sufficiently grow. The temperature that exceeds 1,500° C. is not preferred since unnecessary growth of the particles and sintering of the particles may occur. The heating time may be controlled to a range of from 10 minutes to 24 hours. The hydrated oxide of iron is changed to the iron oxide through the heat treatment. The heat treatment temperature is preferably 800° C. or more and 1,250° C. or less, and more preferably 900° C. or more and 1,150° C. or less. In the heat treatment, the hydrolyzate of the silane compound covering the precipitate of the hydrated oxide of iron is also changed to the silicon oxide. The silicon oxide coating layer also has a function preventing the sintering of the precipitate of the hydrated oxide of iron in the heat treatment.

[Reducing Heat Treatment]

In the iron powder producing step of the present invention, the silicon oxide-coated iron oxide powder as the precursor obtained in the preceding step is subjected to a heat treatment in a reducing atmosphere, so as to provide silicon oxide-coated iron powder. Examples of the gas forming the reducing atmosphere include hydrogen gas and a mixed gas of hydrogen gas and an inert gas. The temperature of the reducing heat treatment may be in a range of 300° C. or more and 1,000° C. or less. The temperature of the reducing heat treatment that is less than 300° C. is not preferred since the reduction of the iron oxide may be insufficient. With the temperature that exceeds 1,000° C., the effect of reduction may be saturated. The heating time may be controlled to a range of from 10 to 120 minutes.

[Stabilization Treatment]

The iron powder obtained through the reducing heat treatment generally has a surface that is significantly chemically active, and therefore is frequently subjected to a stabilization treatment through gradual oxidation. The iron powder obtained in the iron powder producing step of the present invention has a surface that is coated with the silicon oxide, which is chemically inert, but there is a case where a part of the surface thereof is not coated, and therefore the stabilization treatment is preferably performed to form an oxidized protective layer on the exposed portion on the surface of the iron powder. Examples of the procedure of the stabilization treatment include the following.

The atmosphere, to which the silicon oxide-coated iron powder after the reducing heat treatment is exposed, is replaced from the reducing atmosphere to an inert gas atmosphere, and the oxidation reaction of the exposed portion is performed at a temperature of from 20 to 200° C., preferably from 60 to 100° C., while the oxygen concentration in the atmosphere is slowly increased. The inert gas used may be at least one gas component selected from a rare gas and nitrogen gas. The oxygen-containing gas used may be pure oxygen gas and the air. Water vapor may also be introduced along with the oxygen-containing gas. The oxygen concentration, at which the silicon oxide-coated iron powder is retained at a temperature of from 20 to 200° C., preferably from 60 to 100° C., may be finally from 0.1 to 21% by volume. The introduction of the oxygen-containing gas may be performed continuously or intermittently. In the initial stage of the stabilization step, the period of time when the oxygen concentration is 1.0% by volume or less is preferably kept for 5 minutes or more.

[Dissolution Treatment of Silicon Oxide Coating]

The silicon oxide-coated iron powder obtained by the aforementioned sequence of steps cannot be subjected to sufficient press molding, for example, as a material of an inductor. The silicon oxide described above is an auxiliary agent for providing the iron powder through the reaction, and has a function that is different from the coating film described later. It is necessary that the silicon oxide coating layer is once dissolved and removed in an alkali aqueous solution to provide non-coated iron powder, and then the iron powder is coated with a highly insulating silicon oxide.

While the reason of the low volume resistivity of the powder compact is not currently clear, it is considered, for example, that the volume resistivity of the silicon oxide coating layer is decreased by mixing the phosphorus-containing compound into the silicon oxide coating layer, or the defect density in the silicon oxide coating layer is increased by changing the properties of the coating layer.

The alkali aqueous solution used for the dissolution treatment may be an ordinary alkali aqueous solution that is industrially used, such as a sodium hydroxide solution, potassium hydroxide solution, and aqueous ammonia. The pH of the treatment liquid is preferably 10 or more, and the temperature of the treatment liquid is preferably 60° C. or more and the boiling point or less, in consideration of the treatment time and the like.

[Pulverizing]

The iron powder obtained through the dissolution treatment of the silicon oxide coating layer is subjected to the sequence of steps of the silicon oxide coating treatment of the second time described later, and the iron powder may be pulverized before subjecting to the next step. The pulverization can decrease the volume based cumulative 50% particle diameter of the iron powder measured by a Microtrac measurement device. The pulverizing method may be a known method, such as a method by a pulverizing device using a medium, such as a bead mill, and a medialess pulverizing device, such as a jet mill. The medialess pulverizing device is preferably used, and a jet mill pulverizing device is more preferably used since in the method by the pulverizing device using a medium, there is a possibility that the shape of the particles of the resulting iron powder is changed to increase the axial ratio, resulting in the decrease of the packing density of the iron powder in the formation of a molded body in the later step, the deterioration of the magnetic characteristics of the iron powder, and the like. The jet mill pulverizing device herein means a pulverizing device of the system in which an object to be pulverized or a slurry obtained by mixing an object to be pulverized and a liquid is sprayed with a high pressure gas and made to collide with a collision plate or the like. A device of the type of spraying the object to be pulverized with a high pressure gas without the use of a liquid is referred to as a dry jet mill pulverizing device, and a device of the type of using a slurry obtained by mixing the object to be pulverized and a liquid is referred to as a wet jet mill pulverizing device. The target, with which the object to be pulverized or the slurry obtained by mixing the object to be pulverized and a liquid is made to collide, may not be a stationary target, such as a collision plate, but a method of making the object to be pulverized sprayed with a high pressure gas to collide with each other, or making the slurry obtained by mixing the object to be pulverized and a liquid to collide with each other may be used.

The liquid used in the case where the pulverization is performed with the wet jet mill pulverizing device may be an ordinary dispersion medium, such as pure water and ethanol, and ethanol is preferably used.

In the case where the wet jet mill pulverizing device is used for the pulverization, a slurry as a mixture of the pulverized iron powder and the dispersion medium is obtained after the pulverizing treatment, and the pulverized iron powder can be obtained by drying the dispersion medium in the slurry. The drying method may be a known method, and the atmosphere therefor may be the air. From the standpoint of the prevention of oxidation of the iron powder, however, drying in a non-oxidative atmosphere, such as nitrogen gas, argon gas, or hydrogen gas, or vacuum drying is preferably performed. The drying is preferably performed under heating, for example, to 100° C. or more for increasing the drying rate. In the case where the iron powder obtained after drying is again mixed with ethanol and then subjected to the Microtrac particle size distribution measurement, D50 of the iron powder in the slurry after the pulverizing treatment can be substantially reproduced. In other words, D50 of the iron powder is not changed before and after drying.

[Slurry Retaining Step]

The steps for providing a highly insulating silicon oxide coating on the iron powder obtained in the sequence of steps of the iron powder producing step will be described below.

In the production method of the present invention, the iron powder obtained in the iron powder producing step is dispersed in a mixed solvent of water and an organic material containing water in an amount of 1% by mass or more and 40% by mass or less under agitation with a known mechanical means, so as to form a slurry, which is then retained for a prescribed period of time. The iron powder has on the surface thereof an extremely thin oxide of Fe, and in the slurry retaining step, the Fe oxide is hydrated with water contained in the mixed solvent. The hydrated Fe oxide surface is a kind of a solid acid, which exhibits a behavior similar to a weak acid as a Bronsted acid, and therefore, in the addition of a silicon alkoxide to the slurry containing the iron powder in the mixed solvent in the next step, the reactivity between the silanol derivative as a hydrolyzate of the silicon alkoxide and the surface of the iron powder is enhanced, resulting in the enhancement of the uniformity of the silicon oxide coating layer finally formed.

The content of water in the mixed solvent is preferably 1% by mass or more and 40% by mass or less, more preferably 10% by mass or more and 35% by mass or less, and further preferably 15% by mass or more and 30% by mass or less. In the case where the content of water is less than 1% by mass, the function of hydrating the Fe oxide described above may be insufficient, and in the case where the content of water exceeds 40% by mass, the hydrolysis rate of the silicon alkoxide is increased to fail to provide a uniform silicon oxide coating layer, both cases of which are not preferred.

The organic solvent used in the mixed solvent is preferably an aliphatic alcohol having affinity with water, such as methanol, ethanol, 1-propanol, 2-propanol, butanol, pentanol, and hexanol. However, an organic solvent that has a solubility parameter that is too close to that of water may decrease the reactivity of water in the mixed solvent, and therefore it is more preferred to use 1-propanol, 2-propanol (isopropyl alcohol), butanol, pentanol, or hexanol.

In the present invention, the temperature in the slurry retaining step is not particularly determined, and is preferably 20° C. or more and 60° C. or less. The retaining temperature that is less than 20° C. is not preferred since the rate of the hydration reaction of the Fe oxide may be lowered. The retaining temperature that exceeds 60° C. is not preferred since the hydrolysis reaction rate of the silicon alkoxide in the alkoxide adding step as the next step may be increased to deteriorate the uniformity of the silicon oxide coating layer. In the present invention, the retaining time is also not particularly determined, and the condition may be appropriately selected to make the retention time of 10 minutes or more and 180 minutes or less for performing the hydration reaction of the Fe oxide uniformly.

[Alkoxide Adding Step]

To the slurry having the iron powder dispersed in the mixed solvent obtained in the slurry retaining step under agitation with a known mechanical means, a silicon alkoxide is added, and then the slurry is retained to that state for a prescribed period of time. The silicon alkoxide used may be trimethoxysilane, tetramethoxysilane, triethoxysilane, tetraethoxysilane, tripropoxysilane, tetrapropoxysilane, triethoxysilane, tetrabutoxysilane, and the like.

The amount of the silicon alkoxide added may be determined depending on the target value of the volume resistivity of the powder compact, and may be specifically 10% by mass or more. It is estimated that this is because the coated material is unlikely distributed unevenly on an anomalous portion in the iron particle since the particle has a shape close to circle with an axial ratio of 1.5 or less, and thus the silicon alkoxide is attached to the nearly entire surface of the iron particle. The excessive addition thereof is not preferred since the detached thereof from the surface of the iron particles may occur, and specifically the amount thereof added may be 100% by mass or less.

The silicon alkoxide added in this step becomes a silanol derivative through hydrolysis by the action of water contained in the mixed solvent. The formed silanol derivative forms a reaction layer of the silanol derivative on the surface of the iron powder through condensation, chemical adsorption, and the like. It is considered that the hydrolysis of the silicon alkoxide proceeds gradually since no hydrolysis catalyst is added in this step, and thus the reaction layer of the silanol derivative is formed uniformly.

In the present invention, the reaction temperature in the alkoxide adding step is not particularly determined, and is preferably 20° C. or more and 60° C. or less. The reaction temperature that is less than 20° C. is not preferred since the reaction rate of the surface of the iron powder and the silanol derivative may be lowered. The reaction temperature that exceeds 60° C. is not preferred since the hydrolysis reaction rate of the silicon alkoxide added is increased to deteriorate the uniformity of the silicon oxide coating layer. In the present invention, the reaction time of the alkoxide adding step is not particularly determined, and the condition may be appropriately selected to make the reaction time of 5 minutes or more and 180 minutes or less for performing the reaction of the surface of the iron powder and the silanol derivative uniformly.

[Hydrolysis Catalyst Adding Step]

In the production method of the present invention, after forming the reaction layer of the silanol derivative on the surface of the iron powder in the alkoxide adding step, a hydrolysis catalyst for the silicon alkoxide is added to the slurry having the iron powder dispersed in the mixed solvent under agitation with a known mechanical means. In this step, the addition of the hydrolysis catalyst accelerates the hydrolysis reaction of the silicon alkoxide, and the film forming rate of the silicon oxide coating layer is increased. In this and later steps, the similar procedures as the ordinary film forming method by the sol-gel method may be performed.

The hydrolysis catalyst used may be an alkali catalyst. The use of an acid catalyst is not preferred since the iron powder may be dissolved. The alkali catalyst used is preferably aqueous ammonia since aqueous ammonia unlikely leaves impurities in the silicon oxide coating layer, and is easily available.

In the present invention, the reaction temperature in the hydrolysis catalyst adding step is not particularly determined, and may be the same as the reaction temperature in the alkoxide adding step as the preceding step. In the present invention, the reaction time in the hydrolysis catalyst adding step is also not particularly determined, and the condition may be appropriately selected to make the reaction time of 10 minutes or more and 180 minutes or less since the prolonged reaction time is economically disadvantageous.

[Solid-Liquid Separation and Drying]

The silicon oxide-coated iron powder is recovered from the slurry containing the silicon oxide-coated iron powder obtained through the aforementioned sequence of steps, by a known solid-liquid separation means. The solid-liquid separation means used may be a known solid-liquid separation means, such as filtration, centrifugal separation, and decantation. In the solid-liquid separation, an aggregating agent may be added for performing the solid-liquid separation.

The silicon oxide-coated iron powder thus recovered is washed with pure water in an amount of approximately 50 times, and then dried in a nitrogen atmosphere at 50° C. or more and 200° C. or less for 2 hours or more, for example, at 100° C. for 10 hours. After drying, a baking treatment at a higher temperature may be additionally performed for improving the magnetic characteristics of the magnetic material.

[Particle Diameter]

The particle diameter of the iron particles constituting the silicon oxide-coated iron powder and the particle diameter of the iron oxide particles constituting the silicon oxide-coated iron oxide powder were obtained in such a manner that the silicon oxide coating was dissolved and removed by using a 10% by mass sodium hydroxide aqueous solution, and the particles were observed with a scanning electron microscope (SEM). The SEM observation was performed by using S-4700, produced by Hitachi, Ltd.

The silicon oxide was dissolved and removed in such a manner that the silicon oxide-coated iron powder or the silicon oxide-coated iron oxide powder was placed in a 10% by mass sodium hydroxide aqueous solution at 60° C. and agitated for 24 hours, followed by filtering and washing with water. The amount of the sodium hydroxide aqueous solution used was 0.8 L per 5 g of the silicon oxide-coated iron powder or the silicon oxide-coated iron oxide powder.

The SEM observation was performed after the dissolution and removal of the silicon oxide, and for one particle, the length of the long edge of the rectangle having the minimum area that was circumscribed on the particle was designated as the particle diameter (major diameter) of the particle. Specifically, on an SEM image taken at a magnification of approximately from 3,000 to 30,000, 300 particles each having an outer contour, the entire of which was observed, were randomly selected and measured for the particle diameter, and the average value thereof was designated as the average particle diameter of the iron particles constituting the silicon oxide-coated iron powder. The particle diameter obtained by this measurement is the primary particle diameter.

[Axial Ratio]

For one particle on an SEM image, the length of the short edge of the rectangle having the minimum area that is circumscribed on the particle is referred to as the "minor diameter", and the ratio of (major diameter)/(minor diameter) is referred to as the "axial ratio" of the particle. The "average axial ratio", which is the average of the axial ratios of the powder, can be determined as follows. 300 particles randomly selected are measured for the "major diameter" and the "minor diameter" by the SEM observation, the average value of the major diameters and the average value of the minor diameters of all the particles measured are designated as the "average major diameter" and the "average minor diameter" respectively, and the ratio (average major diameter)/(average minor diameter) is designated as the "average axial ratio". The variation coefficients of the major diameter, the minor diameter, and the axial ratio can be calculated as the index of the extent of variation.

[Measurement of Si Content]

The Si contents of the iron powder (not coated) as the starting material and the iron powder having the silicon oxide coating were obtained in the following manner. A specimen was weighed and dissolved in hydrochloric acid, to which perchloric acid was added, followed by heating until the liquid disappeared, and then hydrochloric acid was again added thereto, so as to dissolve the entire acid soluble components. Thereafter, the residue mainly containing silicon dioxide was separated by filtration, placed in a platinum crucible, ignited in an electric furnace, and after cooling, measured for the mass. Hydrofluoric acid and sulfuric acid were added to the platinum crucible after the measurement of the mass, so as to dissolve silicon dioxide, and the solution was heated to evaporate and remove the silicon content as silicon tetrafluoride. Thereafter, the platinum crucible was again ignited, and after cooling, measured for the mass, and the difference from the mass measured previously was designated as the amount of silicon dioxide. The amount of silicon in the specimen was calculated from the amount of silicon dioxide measured.

[Measurement of Fe and P Contents]

The Fe and P contents of the iron powder (not coated) as the starting material and the iron powder having the silicon oxide coating were obtained in the following manner. A specimen was weighed and dissolved under heating in an aqueous solution at 100° C. obtained by mixing a 36% by mass hydrogen chloride aqueous solution and a 60% by mass nitric acid aqueous solution at a volume ratio of 1/1, then the residue was filtered, and the filtrate was determined for volume with a measuring flask. The solution was diluted, and then measured for the Fe and P concentrations by the ICP atomic emission spectroscopic analysis method (ICP-AES).

The residue obtained above was placed in a platinum crucible along with the filter paper, which was incinerated by igniting the platinum crucible in an electric furnace, and after cooling, sodium carbonate and potassium carbonate were added thereto, followed by melting in an electric furnace. After cooling, the molten material was leached into warm water, to which hydrochloric acid was added, followed by dissolving under heating. The solution was measured for volume with a measuring flask, and the Fe and P concentrations were measured by the ICP atomic emission spectroscopic analysis method (ICP-AES). The contents of the elements were obtained from the ICP measurement values of the filtrate and the ICP measurement values of the solution after melting the residue.

[Calculation of Average Film Thickness of Silicon Oxide Coating]

The average thickness t of the silicon oxide coating in the silicon oxide-coated iron powder was calculated according to the following expression.

Average thickness $t$=Si content (% by mass)/100×($SiO_2$ molecular weight/Si atomic weight)/($SiO_2$ density×BET specific surface area of iron powder (non-coated))

The calculation was performed with the $SiO_2$ density of 2.65 (g/cm$^3$). In the present invention, the average thickness t of the silicon oxide is preferably 1.0 nm or more and 6.0 nm or less. The average thickness t that is in the range can achieve both high μ' and the high volume resistivity of the powder compact. The average thickness t that is less than 1.0 nm is not preferred since the volume resistivity of the powder compact may be decreased. The average thickness t that exceeds 6.0 nm is not preferred since μ' may be decreased.

[Magnetic Characteristics]

The B-H curve was measured with VSM (VSM-P7, produced by Toei Industry Co., Ltd.) under an applied magnetic field of 795.8 kA/m (10 kOe), and the coercive force Hc, the saturation magnetization σs, and the squareness ratio SQ were evaluated.

[Complex Permeability]

The iron powder or the silicon oxide-coated iron powder and a bisphenol F type epoxy resin (one-component epoxy resin B-1106, produced by Tesk Co., Ltd.) were weighed at a mass ratio of 90/10, and kneaded with a rotation and revolution mixer (ARE-250, produced by Thinky Corporation), so as to provide a paste having the test powder dispersed in the epoxy resin. The paste was dried on a hot plate at 60° C. for 2 hours to provide a composite of the metal powder and the resin, which was then pulverized into particles, which were designated as composite powder. 0.2 g of the composite powder was placed in a toroidal vessel and applied with a load of 9,800 N (1 ton) with a hand press to provide a molded body having a toroidal shape having an outer diameter of 7 mm and an inner diameter of 3 mm. The molded body was measured for the real part μ' and the imaginary part μ" of the complex relative at 100 MHz with an RF impedance analyzer (E4990A, produced by Keysight Technologies, Inc.), a terminal adapter (42942A, produced by Keysight Technologies, Inc.), and a test fixture (16454A, produced by Keysight Technologies, Inc.), and the loss factor of the complex relative permeability tan δ=μ"/μ' was obtained. In the description herein, the real part μ' of the complex relative permeability may be referred simply to as the "permeability" or "μ'". The use of the silicon oxide-coated iron powder of the present invention can provide a molded body having a permeability μ' at 100 MHz of 3.0 or more.

The molded body produced by using the silicon oxide-coated iron powder of the present invention exhibits excellent complex permeability characteristics, and can be favorably used for the purpose of a magnetic core of an inductor, and the like.

[BET Specific Surface Area]

The BET specific surface area was obtained by the BET one-point method with Macsorb model 1210, produced by Mountech Co., Ltd.).

[Microtrac Particle Size Distribution Measurement]

For the measurement of the volume based cumulative 50% particle diameter and cumulative 90% particle diameter of the iron powder, a Microtrac particle size distribution measurement device, MT3300EXII, produced by MicrotracBEL Corporation, was used. The liquid placed in a specimen circulator of the measurement device was ethanol. The iron powder was formed into a slurry by mixing with ethanol or pure water, and immediately before feeding, the slurry was agitated to such an extent that no non-uniform portion was visually observed, and then fed to the measurement device.

[Measurement of Volume Resistivity and Powder Compact Density]

The volume resistivity of the silicon oxide-coated iron powder was measured in such a manner that a powder compact obtained through vertical compression molding at 64 MPa (20 kN) of 4.0 g of the powder was measured in a state of applying a voltage of 10 V to the powder compact, by the double ring electrode method with a powder resistance measurement unit (MCP-PD51), produced by Mitsubishi Chemical Analytech Co., Ltd., a high resistance resistivity meter Hiresta UP (MCP-HT450), produced by Mitsubishi Chemical Analytech Co., Ltd., and a high resistance powder measurement system software, produced by Mitsubishi Chemical Analytech Co., Ltd.

Specifically, the volume resistivity ρv was calculated by the following expression.

$$\rho v = R \times \pi d^2 / 4t$$

In the expression, R represents the measured value of the volume resistivity, d represents the diameter of the inner ring of the surface electrode, and t represents the thickness of the powder specimen. In the examples described below, the diameter of the inner ring of the surface electrode was always 2.0 cm.

The powder compact density was calculated from the specimen volume and the specimen weight of the aforementioned powder compact obtained through compression molding at 64 MPa (20 kN).

EXAMPLES

Comparative Example 1

In a 5 L reaction tank, 566.47 g of iron(III) nitrate nonahydrate having a purity of 99.7% by mass and 1.39 g of a 85% by mass $H_3PO_4$ aqueous solution as a supply source of a phosphorus-containing ion were dissolved in 4,113.24 g of pure water in the air atmosphere under mechanical agitation with agitation blades (procedure 1). The solution had pH of approximately 1. The ratio P/Fe under the condition was 0.0086.

In the air atmosphere, 409.66 g of a 23.47% by mass ammonia solution was added to the raw material solution under mechanical agitation with agitation blades under a condition of 30° C. over 10 minutes (approximately 40 g/L), and after completing the dropwise addition, the precipitate thus formed was aged by continuing the agitation for 30 minutes. At this time, the slurry containing the precipitate had pH of approximately 9 (procedure 2).

55.18 g of tetraethoxysilane (TEOS) having a purity of 95.0% by mass was added dropwise to the slurry obtained in the procedure 2 under agitation in the air at 30° C. over 10 minutes. Thereafter, the agitation was continued for 20 hours, and thereby the precipitate was coated with the hydrolyzate of the silane compound formed through hydrolysis (procedure 3). The ratio Si/Fe under the condition was 0.18. The ratio Si/Fe and the ratio P/Fe of this comparative examples are shown in Table 1.

The slurry obtained in the procedure 3 was filtered, and after draining off water contained in the resulting precipitate coated with the hydrolyzate of the silane compound as much as possible, the precipitate was again dispersed in pure water for repulping washing. The slurry after washing was again filtered, and the resulting cake was dried in the air at 110° C. (procedure 4).

The dried product obtained in the procedure 4 was subjected to a heat treatment in the air at 1,050° C. with a box type baking furnace, so as to provide silicon oxide-coated iron oxide powder (procedure 5).

The silicon oxide-coated iron oxide powder obtained in the procedure 5 was placed in an air-permeable bucket, and a reducing heat treatment was performed by charging the bucket in a through type reducing furnace and retaining at 630° C. for 40 minutes while flowing hydrogen gas in the furnace (procedure 6).

Subsequently, the atmospheric gas in the furnace was changed from hydrogen to nitrogen, and the temperature in the furnace was decreased to 80° C. at a temperature fall rate of $20^2$C/min under flowing nitrogen gas. Thereafter, a mixed gas of nitrogen gas and the air at a volume ratio of nitrogen gas/air of 125/1 (oxygen concentration: approximately 0.17% by volume) as the initial gas for performing a stabilization treatment was introduced to the furnace to initiate the oxidation reaction of the surface layer portion of the metal powder particles, thereafter the mixing ratio of the air was gradually increased, and finally a mixed gas of nitrogen gas and the air at a volume ratio of nitrogen gas/air of 25/1 (oxygen concentration: approximately 0.80% by volume) was continuously introduced to the furnace, so as to form an oxidized protective layer on the surface layer portion of the particles. In the stabilization treatment, the temperature was retained to 80° C., and the flow rate of the gas introduced was retained to the substantially constant value (procedure 7).

The silicon oxide-coated iron powder obtained in the procedure 7 was immersed in a 10% by mass sodium hydroxide aqueous solution at 60° C. for 24 hours to dissolve the silicon oxide coating. The resulting slurry containing the iron powder was filtered by suction filtration with a membrane filter, washed with water, and then dried in nitrogen at 110° C. for 2 hours to provide iron powder. The amount of the sodium hydroxide aqueous solution was 3.2 L per 56 g of the silicon oxide-coated iron powder.

FIG. 1 shows the SEM observation result of the iron powder obtained in this comparative example. In FIG. 1, the length shown by the 11 white vertical lines shown in the right lower part of the SEM image is 5 μm (which is the same as in FIG. 2). The resulting iron powder was measured for the average particle diameter, the average axial ratio, the composition, the BET specific surface area, and the magnetic characteristics of the iron particles. The measurement results are shown in Table 2. The iron particles constituting the resulting iron powder had an average particle diameter of 0.51 μm and an average axial ratio of 1.27. A powder compact was obtained by molding the resulting iron powder by the method described above, and measured for the volume resistivity, and as a result, the measured value R of the resistance was lower than the measurement limit, and the volume resistivity was also lower than the measurement limit (volume resistivity of $9.9\times10^4$ Ω·cm). The volume resistivity and the density of the powder compact obtained by molding the resulting iron powder by the method described above, and the high frequency characteristics of the molded body having a toroidal shape obtained by molding by the method described above are shown in Table 2. The volume resistivity of the powder compact obtained in this comparative example is lower than the measurement limit since the iron powder is not coated with an insulating silicon oxide.

Example 1

In a 1 L reaction tank, 54.09 g of pure water and 271 g of isopropyl alcohol (IPA) were placed to form a mixed solvent, and 15.00 g of iron powder produced under the same condition as in Comparative Example 1 was added to the mixed solvent, followed by purging with nitrogen for 30 minutes at room temperature under mechanical agitation with agitation blades. After 30 minutes elapsed, the reaction solution was heated to 40° C. while continuing the agitation and the nitrogen purge.

Thereafter, 9.06 g of tetraethoxysilane (TEAS) was added at once to the reaction solution, which was retained for 10 minutes. After 10 minutes elapsed, 10.8 g of aqueous ammonia having a concentration of 10% by mass was continuously added to the reaction solution over 45 minutes. After completing the addition of aqueous ammonia, the reaction solution was aged by retaining for 60 minutes, so as to coat the surface of the iron powder with a hydrolyzate of the silane compound formed through hydrolysis. The conditions of the iron powder producing step and the sequence of steps for performing the silicon oxide coating are shown in Table 1.

The resulting slurry was filtered by suction filtration with a membrane filter, and then washed with pure water to provide a cake of the iron powder, which was dried in a nitrogen atmosphere at 100° C. FIG. 2 shows the SEM observation result of the iron powder obtained through the sequence of steps, which was again coated after the dissolution and removal of the silicon oxide. The silicon oxide-coated iron powder was measured for the BET specific surface area, the composition, the magnetic characteristics, the complex permeability, and the density and the volume resistivity of the powder compact. The measurement results are shown in Table 2. As a result of the measurement of the volume resistivity, the measured value R of the volume resistivity was $1.4\times10^6$ (Ω), and the thickness t of the powder specimen was 0.429 (cm).

Examples 2 to 10

As similar to Example 1, silicon oxide-coated iron powder was obtained by using 15.00 g of iron powder obtained under the same condition as in Comparative Example 1, with the condition for coating a silicon oxide changed variously. The conditions of the silicon oxide coating used in these examples are shown in Table 1. In Example 10, the pulverization treatment of the iron powder was performed before the silicon oxide coating treatment. The pulverization treatment condition of the iron powder is shown below. The iron powder obtained in Comparative Example 1 was mixed with pure water to provide an iron powder-pure water mixed slurry having a content ratio of the iron powder of 10% by mass. The slurry was pulverized with a jet mill pulverization device (Nanoatomizer G-smasher LM-1000, produced by RIX Corporation), so as to provide a slurry after the pulverization treatment. In the pulverization, the feeding rate of the iron powder-pure water mixed slurry was 100 mL/min, the air pressure was 0.6 MPa, and the pulverization treatment was repeated 5 times. The slurry after the pulverization treatment was dried in nitrogen gas at 100° C. for 2 hours, so as to provide iron powder of Example 10.

The silicon oxide-coated iron powder obtained in these examples was measured for the BET specific surface area, the composition, the magnetic characteristics, the complex permeability, and the density and the volume resistivity of the powder compact. The measurement results are shown in Table 2.

Example 11

Iron powder was obtained in the same procedures as the procedures 1 to 8 of Comparative Example 1 except that the heat treatment temperature in the air was changed to 1,020° C. The resulting iron powder was measured for the average particle diameter, the average axial ratio, the composition, the BET specific surface area, and the magnetic characteristics of the iron particles. The measurement results are shown in Table 2. The iron particles constituting the resulting iron powder had an average particle diameter of 0.31 μm and an average axial ratio of 1.20.

The resulting iron powder was mixed with pure water to provide an iron powder-pure water mixed slurry having a content ratio of the iron powder of 10% by mass. The slurry was pulverized with a jet mill pulverization device (Star Burst Mini, Model. Number: HJP-25001, produced by Sugino Machine, Ltd.), so as to provide a slurry after the pulverization treatment. In the pulverization, the pressure for pressurizing the iron powder-pure water mixed slurry was 245 MPa, and the pulverization treatment was repeated 10 times. The slurry after the pulverization treatment was dried in nitrogen gas at 100° C. for 2 hours, so as to provide iron powder after the pulverization treatment (procedure 19).

In a 1 L reaction tank, 54.09 g of pure water and 196 g of isopropyl alcohol (IPA) were placed to form a mixed solvent, and 15.00 g of iron powder obtained in the procedure 19 was added to the mixed solvent, followed by purging with nitrogen for 30 minutes at room temperature under mechanical agitation with agitation blades. After 30 minutes elapsed, the reaction solution was heated to 40° C. while continuing the agitation and the nitrogen purge.

Thereafter, 2.55 g of tetraethoxysilane (TEOS) was added at once to the reaction solution, which was retained for 10 minutes. After 10 minutes elapsed, 9.4 g of aqueous ammonia having a concentration of 10% by mass was continuously added to the reaction solution over 45 minutes. After completing the addition of aqueous ammonia, the reaction solution was aged by retaining for 60 minutes, so as to coat the surface of the iron powder with a hydrolyzate of the silane compound formed through hydrolysis. The conditions of the iron powder producing step and the sequence of steps for performing the silicon oxide coating are shown in Table 1.

The resulting slurry was filtered by suction filtration with a membrane filter, and then washed with pure water to provide a cake of the iron powder, which was dried in a nitrogen atmosphere at 100° C. The silicon oxide-coated iron powder was measured for the BET specific surface area, the composition, the magnetic characteristics, the complex permeability, and the density and the volume resistivity of the powder compact. The measurement results are shown in Table 2. As a result of the measurement of the volume resistivity, the measured value R of the volume resistivity was $3.9\times10^4$ (Ω), and the thickness t of the powder specimen was 0.381 (cm).

Example 12

Iron powder was obtained in the same procedures as in Comparative Example 1 except that the heat treatment in the air with a box type baking furnace was performed at 1,090° C. The silicon oxide coating treatment was performed under the same condition as in Example 11 except that the amount of TEAS added was changed to 1.27 g, so as to provide silicon oxide-coated iron powder. The conditions of the iron powder producing step and the sequence of steps for performing the silicon oxide coating are shown in Table 1.

The resulting slurry was filtered by suction filtration with a membrane filter, and then washed with pure water to provide a cake of the iron powder, which was dried in a nitrogen atmosphere at 100° C. The silicon oxide-coated iron powder was measured for the BET specific surface area, the composition, the magnetic characteristics, the complex permeability, and the density and the volume resistivity of the powder compact. The measurement results are shown in Table 2. As a result of the measurement of the volume resistivity, the measured value R of the volume resistivity was $3.8\times10^4$ (Ω), and the thickness t of the powder specimen was 0.412 (cm).

Comparative Example 2

Silicon oxide-coated iron powder was obtained by using the same condition as in Example 2 except that the amount of TEOS added was changed to 0.91 g. The conditions of the silicon oxide coating used in this comparative example are shown in Table 1. The measurement results of the BET specific surface area, the composition, the magnetic characteristics, the complex permeability, and the density and the volume resistivity of the powder compact of the silicon oxide-coated iron powder obtained in this comparative example are shown in Table 2.

The silicon oxide-coated iron powder obtained in this comparative example had a Si content of 0.9%, and had an insufficient thickness of the silicon oxide coating layer, and thus the volume resistivity of the powder compact was $9.9\times10^4$ Ω·cm or less. This volume resistivity was significantly inferior to those of Examples 1 to 10.

Comparative Example 3

In a 5 L reaction tank, 566.47 g of iron(III) nitrate nonahydrate having a purity of 99.7% by mass and 1.39 g of a 85% by mass $H_3PO_4$ aqueous solution as a supply source of a phosphorus-containing ion were dissolved in 4,113.24 g of pure water in the air atmosphere under mechanical agitation with agitation blades (procedure 1). The solution had pH of approximately 1. The ratio P/Fe under the condition was 0.0086.

In the air atmosphere, 409.66 g of a 23.47% by mass ammonia solution was added to the raw material solution under mechanical agitation with agitation blades under a condition of 30° C. over 10 minutes (approximately 40 g/L), and after completing the dropwise addition, the precipitate thus formed was aged by continuing the agitation for 30 minutes. At this time, the slurry containing the precipitate had pH of approximately 9 (procedure 2).

55.18 g of tetraethoxysilane (TEOS) having a purity of 95.0% by mass was added dropwise to the slurry obtained in the procedure 2 under agitation in the air at 30° C. Thereafter, the agitation was continued for 20 hours, and thereby the precipitate was coated with the hydrolyzate of the silane compound formed through hydrolysis (procedure 3). The ratio Si/Fe under the condition was 0.18.

The slurry obtained in the procedure 3 was filtered, and after draining off water contained in the resulting precipitate coated with the hydrolyzate of the silane compound as much as possible, the precipitate was again dispersed in pure water for repulping washing. The slurry after washing was again filtered, and the resulting cake was dried in the air at 110° C. (procedure 4). The dried product obtained in the procedure 4 was subjected to a heat treatment in the air at 1,050° C. with a box type baking furnace, so as to provide silicon oxide-coated iron oxide powder (procedure 5). The silicon oxide-coated iron oxide powder obtained in the procedure 5 was placed in an air-permeable bucket, and a reducing heat treatment was performed by charging the bucket in a through type reducing furnace and retaining at 630° C. for 40 minutes while flowing hydrogen gas in the furnace (procedure 6).

Subsequently, the atmospheric gas in the furnace was changed from hydrogen to nitrogen, and the temperature in the furnace was decreased to 80° C. at a temperature fall rate of 20° C./min under flowing nitrogen gas. Thereafter, a mixed gas of nitrogen gas and the air at a volume ratio of nitrogen gas/air of 125/1 (oxygen concentration: approximately 0.17% by volume) as the initial gas for performing a stabilization treatment was introduced to the furnace to initiate the oxidation reaction of the surface layer portion of the metal powder particles, thereafter the mixing ratio of the air was gradually increased, and finally a mixed gas of nitrogen gas and the air at a volume ratio of nitrogen gas/air of 25/1 (oxygen concentration: approximately 0.80% by volume) was continuously introduced to the furnace, so as to form an oxidized protective layer on the surface layer portion of the particles. In the stabilization treatment, the temperature was retained to 80° C., and the flow rate of the gas introduced was retained to the substantially constant value (procedure 7).

The silicon oxide-coated iron powder obtained through the sequence of steps was measured for the magnetic characteristics, the BET specific surface area, and the particle diameter and the complex permeability of the iron particles. The measurement results are shown in Table 2.

The silicon oxide coating of the silicon oxide-coated iron powder obtained in this comparative example contained the phosphorus-containing compound, and the volume resistivity of the powder compact was $9.9\times10^4$ Ω·cm or less.

It is understood from Examples and Comparative Examples that silicon oxide-coated iron powder that has a small particle diameter, can achieve high μ' in a high frequency band, and has high insulating property can be obtained by providing the prescribed silicon oxide coating on the iron powder defined in the present invention.

TABLE 1

| | Iron powder producing step | | | | Silicon oxide coating step | | | | | | | Drying step |
|---|---|---|---|---|---|---|---|---|---|---|---|---|
| | Si/Fe molar ratio | P/Fe molar ratio | Removal of silicon oxide | Pulverizing step | IPA weight (g) | Pure water weight (g) | TEOS weight (g) | $NH_3$ concentration (% by mass) | $NH_3$ amount added (g) | $NH_3$ addition time (min) | Temperature (° C.) | Temperature (° C.) |
| Comparative Example 1 | 0.18 | 0.0086 | yes | no | — | — | — | — | — | — | — | — |
| Example 1 | 0.18 | 0.0086 | yes | no | 271 | 9.00 | 9.06 | 10.0 | 10.8 | 45 | 40 | 100 |
| Example 2 | 0.18 | 0.0086 | yes | no | 196 | 54.09 | 9.06 | 23.0 | 41.1 | 45 | 40 | 100 |
| Example 3 | 0.18 | 0.0086 | yes | no | 196 | 54.09 | 1.81 | 23.0 | 41.1 | 45 | 40 | 100 |
| Example 4 | 0.18 | 0.0086 | yes | no | 248 | 9.00 | 1.81 | 23.0 | 41.1 | 45 | 40 | 100 |
| Example 5 | 0.18 | 0.0086 | yes | no | 248 | 54.09 | 1.81 | 3.3 | 32.7 | 45 | 40 | 100 |
| Example 6 | 0.18 | 0.0086 | yes | no | 196 | 54.09 | 1.81 | 23.0 | 41.1 | 45 | 50 | 100 |
| Example 7 | 0.18 | 0.0086 | yes | no | 196 | 54.09 | 1.81 | 23.0 | 41.1 | 45 | 30 | 100 |
| Example 8 | 0.18 | 0.0086 | yes | no | 196 | 54.09 | 1.81 | 23.0 | 41.1 | 1 | 40 | 100 |
| Example 9 | 0.18 | 0.0086 | yes | no | 196 | 54.09 | 1.81 | 23.0 | 41.1 | 87 | 40 | 100 |
| Example 10 | 0.18 | 0.0086 | yes | yes | 196 | 54.09 | 2.43 | 23.0 | 41.1 | 45 | 40 | 100 |
| Comparative Example 2 | 0.18 | 0.0086 | yes | no | 196 | 54.09 | 0.91 | 23.0 | 41.1 | 45 | 40 | 100 |
| Comparative Example 3 | 0.18 | 0.0086 | no | no | — | — | — | — | — | — | — | — |
| Example 11 | 0.18 | 0.0086 | yes | yes | 196 | 54.09 | 2.55 | 10.0 | 9.4 | 45 | 40 | 100 |
| Example 12 | 0.18 | 0.0086 | yes | no | 196 | 54.09 | 1.27 | 10.0 | 9.4 | 45 | 40 | 100 |

TABLE 2

| | Silicon oxide-coated iron powder | | | | | | | |
|---|---|---|---|---|---|---|---|---|
| | | | | Composition | | | | Magnetic characteristics |
| | Iron particle average particle diameter (μm) | Iron particle average axial ratio | BET specific surface area | Fe (% by mass) | P (% by mass) | Si (% by mass) | Average film thickness of coating (nm) | Coercive force Hc (kA/m) |
| Comparative Example 1 | 0.51 | 1.27 | 10.2 | 92.9 | 0.18 | <0.1 | — | 75 |
| Example 1 | 0.51 | 1.27 | 5.2 | 91.2 | 0.18 | 1.9 | 1.5 | 73 |
| Example 2 | 0.51 | 1.27 | 19.3 | 86.9 | 0.17 | 6.9 | 5.5 | 77 |
| Example 3 | 0.51 | 1.27 | 6.8 | 91.3 | 0.18 | 1.7 | 1.3 | 74 |
| Example 4 | 0.51 | 1.27 | 5.4 | 91.3 | 0.18 | 1.8 | 1.4 | 73 |
| Example 5 | 0.51 | 1.27 | 5.5 | 91.3 | 0.18 | 1.7 | 1.3 | 74 |
| Example 6 | 0.51 | 1.27 | 5.7 | 91.3 | 0.18 | 1.7 | 1.3 | 75 |
| Example 7 | 0.51 | 1.27 | 6.2 | 91.3 | 0.18 | 1.7 | 1.3 | 74 |

TABLE 2-continued

| | | | | | | | | |
|---|---|---|---|---|---|---|---|---|
| Example 8 | 0.51 | 1.27 | 10.6 | 91.3 | 0.18 | 1.7 | 1.3 | 74 |
| Example 9 | 0.51 | 1.27 | 8.7 | 91.3 | 0.18 | 1.8 | 1.4 | 74 |
| Example 10 | 0.51 | 1.27 | 17.4 | 90.9 | 0.18 | 2.2 | 1.7 | 58 |
| Comparative Example 2 | 0.51 | 1.27 | 7.2 | 92.1 | 0.18 | 0.9 | 0.7 | 73 |
| Comparative Example 3 | 0.54 | 1.34 | 4.03 | 81.8 | 0.38 | 7.7 | 6.1 | |
| Example 11 | 0.31 | 1.20 | 9.0 | 90.0 | 0.22 | 2.1 | 1.2 | 59 |
| Example 12 | 0.76 | 1.32 | 9.3 | 91.1 | 0.22 | 2.1 | 2.3 | 63 |

| | Silicon oxide-coated iron powder Magnetic characteristics Saturation magnetization $\sigma s$ ($Am^2/kg$) | Powder compact | | | | | |
|---|---|---|---|---|---|---|---|
| | | Volume resistivity measured value (Ω) | Powder compact thickness (mm) | Volume resistivity (Ω · cm) | Powder compact density ($g/cm^3$) | High frequency characteristics (100 MHz) | |
| | | | | | | permeability μ' | Magnetic toss tanδ |
| Comparative Example 1 | 178.5 | lower limit or less | 3.93 | $<1.0 \times 10^5$ | 3.25 | 5.43 | 0.019 |
| Example 1 | 171.9 | $1.4 \times 10^6$ | 4.29 | $1.0 \times 10^7$ | 2.97 | 4.64 | 0.019 |
| Example 2 | 150.7 | $1.8 \times 10^8$ | 5.33 | $1.1 \times 10^9$ | 2.39 | 3.09 | 0.012 |
| Example 3 | 171.6 | $1.9 \times 10^5$ | 4.37 | $1.3 \times 10^6$ | 2.91 | 4.75 | 0.020 |
| Example 4 | 170.3 | $6.5 \times 10^4$ | 4.15 | $4.9 \times 10^5$ | 3.07 | 4.84 | 0.025 |
| Example 5 | 172.0 | $4.6 \times 10^4$ | 4.21 | $3.4 \times 10^5$ | 3.02 | 4.96 | 0.026 |
| Example 6 | 171.9 | $6.6 \times 10^4$ | 4.17 | $4.9 \times 10^5$ | 3.05 | 5.02 | 0.027 |
| Example 7 | 173.1 | $4.3 \times 10^s$ | 4.19 | $3.2 \times 10^5$ | 3.04 | 4.85 | 0.026 |
| Example 8 | 173.9 | $5.2 \times 10^5$ | 4.34 | $3.8 \times 10^5$ | 2.93 | 4.68 | 0.024 |
| Example 9 | 172.6 | $2.9 \times 10^5$ | 4.30 | $2.1 \times 10^6$ | 2.96 | 4.81 | 0.024 |
| Example 10 | 170.8 | $2.0 \times 10^5$ | 4.02 | $1.5 \times 10^7$ | 3.17 | 4.83 | 0.027 |
| Comparative Example 2 | 176.0 | lower limit or less | 4.05 | $<1.0 \times 10^5$ | 3.15 | 5.31 | 0.022 |
| Comparative Example 3 | | lower limit or less | 5.62 | $<1.0 \times 10^5$ | 2.27 | 4.38 | 0.014 |
| Example 11 | 170.7 | $3.9 \times 10^4$ | 3.81 | $1.5 \times 10^5$ | 3.66 | 7.28 | 0.020 |
| Example 12 | 169.7 | $3.8 \times 10^4$ | 4.12 | $6.6 \times 10^5$ | 3.61 | 7.00 | 0.017 |

The invention claimed is:

1. A silicon oxide-coated iron powder comprising iron particles having an average particle diameter of 0.25 μm or more and 0.80 μm or less and an average axial ratio of 1.5 or less, having coated on a surface thereof a silicon oxide, the silicon oxide-coated iron powder having a volume resistivity of $1.0 \times 10^5$ Ω·cm or more measured in a state of applying a voltage of 10 V to a powder compact made of the silicon oxide-coated iron powder by vertical compression molding of the silicon oxide-coated iron powder at 64 MPa, wherein the iron particles comprise less than 0.1 mass % of Si and the silicon oxide-coated iron powder has a Si content of 1.0% by mass or more and 10% by mass or less.

2. The silicon oxide-coated iron powder according to claim 1, wherein the silicon oxide-coated iron powder has a P content of the iron particles of 0.1% by mass or more and 1.0% by mass or less based on the mass of the iron particles.

3. A molded body for an inductor, comprising the silicon oxide-coated iron powder according to claim 1.

4. An inductor comprising the silicon oxide-coated iron powder according to claim 1.

* * * * *